United States Patent

[11] 3,567,837

| | | |
|---|---|---|
| [72] | Inventors | Jack A. Van Nostran;<br>Otis D. Jordan, North Canton, Ohio |
| [21] | Appl. No. | 877,985 |
| [22] | Filed | Nov. 19, 1969<br>Division of Ser. No. 780,668, Dec. 3, 1968 |
| [45] | Patented | Mar. 2, 1971 |
| [73] | Assignee | Ohio Ferro-Alloys Corporation<br>Canton, Ohio |

[54] ELECTRIC FURNACE FOR ARC MELTING
4 Claims, 2 Drawing Figs.

[52] U.S. Cl. .................................................. 13/12,
323/110, 323/124
[51] Int. Cl. ................................................ H05b 7/18
[50] Field of Search ........................................ 13/12, 9,
13; 323/110, 124, 128

[56] References Cited
UNITED STATES PATENTS
1,698,581  1/1929  Campbell et al. .............. 323/124X
3,300,712  1/1967  Segsworth .................... 13/12X

*Primary Examiner*—Bernard A. Gilheany
*Assistant Examiner*—Roy N. Envall, Jr.
*Attorney*—Frease and Bishop ABSTRACT: An electric furnace for arc melting having electrodes connected to a main source of electrical power. A transformer having high voltage windings and low voltage windings is provided. There is means for independently connecting the electrodes to the low voltage windings of said transformer, and means for connecting the high voltage windings of the transformer to power factor correctional devices. The transformer is a three phase transformer and there are a plurality of power factor correctional devices connected to the high voltage winding of each phase of the transformer. The power factor correctional devices are preferably capacitors. Circuit breakers are provided for connecting the capacitors to the high voltage windings and disconnecting them therefrom and for changing the amount of capacitance connected to the high voltage windings.

INVENTORS
Jack A. Van Nostran
and Otis D. Jordan
BY
Frease & Bishop
ATTORNEYS 3,567,837

ELECTRIC FURNACE FOR ARC MELTING

This is a division of our prior application Ser. No. 780,668 filed Dec. 3, 1968, of which 2 the following is a specification.

BACKGROUND OF THE INVENTION

1. Field of the Invention

The invention relates to electrical furnaces for arc melting and includes three electrodes, a three phase transformer having a high voltage winding and low voltage winding having means for independently connecting the electrodes to the low voltage winding of the transformer, a power factor correctional device in the form of a capacitor and means for connecting the high voltage winding of the transformer of each of the phases of the transformer, and circuit breakers for connecting the capacitors to the high voltage windings and disconnecting them therefrom and for changing the amount of capacitance connected to the high voltage winding.

2. Description of the Prior Art

There is no prior art similar to this invention known to the applicants. The closest U.S. patents of which we know are the following:

U.S. Pat. No. 1,596,902 to Taylor, class 13 subclass 14(x);
U.S. Pat. No. 2,458,272 to Jones, class 13 subclass 14;
U.S. Pat. No. 2,778,865 to Kongsgaarden, class 13 subclass 16;
U.S. Pat. No. 2,899,667 to Bredtschneider, class 13 subclass 9(x);
U.S. Pat. No. 3,268,633 to Jansen, class 264 subclass 27;
U.S. Pat. No. 3,286,003 to Bullough et al., class 264 subclass 29;
U.S. Pat. No. 3,365,533 to Alexander, class 13 subclass 9(x).

None of the above patents discloses the features of applicants' invention above described.

SUMMARY OF THE INVENTION

In general terms, the invention may be briefly described as comprising an electric arc furnace including a plurality of electrodes, a main source of electrical power, means for connecting the electrodes to said source of electrical power, a transformer having high voltage windings and low voltage windings, means for connecting the electrodes to said low voltage windings of the transformer, power factor correctional devices such as capacitors, and means such as circuit breakers for connecting the capacitors to the high voltage windings and disconnecting them therefrom and for changing the amount of capacitance connected to the high voltage windings.

Each electrode is suspended upon an axially-arranged, preferably tubular column by threaded attachment thereto, said axially-arranged tubular column being an electrical conductor and being connected to electrical apparatus independent of a main power source, or to a main power source. The axially-arranged tubular column may be rotatable and may be connected to an electrical transformer.

It is, therefore, an object of the invention to provide an electric arc furnace having a carbon electrode suspended therein on an axially-arranged electrical conductor column by threaded attachment thereto.

Another object of the invention is to provide such an electric arc furnace in which the electrical conductor column is tubular.

A further object of the invention is to provide an electric arc furnace of the character referred to in which the axially-arranged tubular column is connected to electrical apparatus independent of a main power source.

A still further object of the invention is to provide an electric arc furnace of the type in which the axially-arranged tubular column is connected to a main power source.

Another object of the invention is to provide such an electric arc furnace in which the axially-arranged tubular column is connected to an electric transformer.

A further object of the invention is to provide an electric arc furnace of the type referred to in which the axially-arranged tubular column is rotatable.

A still further object of the invention is to provide an electric arc furnace of this type having electrodes, means for connecting the electrodes to a main source of electrical power, a transformer having high voltage windings and low voltage windings, means for independently connecting the electrodes to the low voltage windings of the transformer, power factor correctional devices, and means for connecting the high voltage windings of the transformer to the power factor correctional devices.

Another object of the invention is to provide such an electrical arc furnace in which the transformer is a three phase transformer, and a plurality of power factor correctional devices are connected to the high voltage windings of each phase of the transformer.

A further object of the invention is to provide an electrical arc furnace of the character referred to in which the said power factor correctional devices are capacitors.

A further object of the invention is to provide an electrical furnace of this type having circuit breakers for connecting the capacitors to the high voltage windings and disconnecting them therefrom and for changing the amount of capacitance connected to the high voltage windings.

These and other objects, apparent from the drawings and following description, may be attained, the above-described difficulties overcome and the advantages and results obtained, by the apparatus, construction, arrangement, and combination, subcombinations and parts, and methods, steps, procedures, and modes of operation, which comprise the present invention, a preferred embodiment of which, illustrative of the best mode in which applicants have contemplated applying the principle, being set forth in detail in the following description and illustrated in the accompanying drawings.

DESCRIPTION OF THE PREFERRED EMBODIMENT

Figure 1:
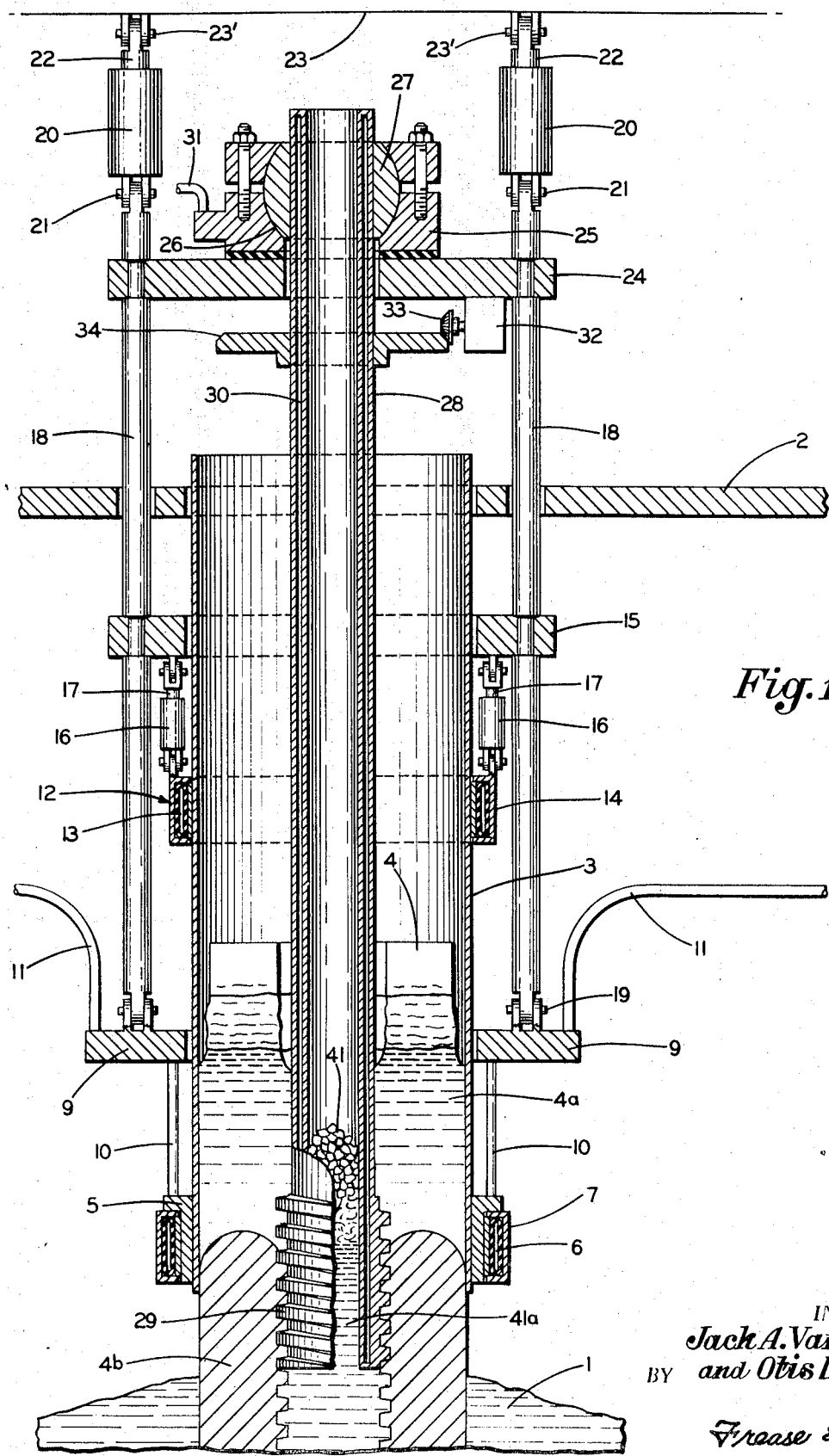
FIG. 1 is a vertical sectional view through self-baking electrode mechanism embodying the invention.

Referring now more particularly to the embodiment illustrated, the upper portion of a furnace charge is indicated at 1. The furnace itself is not illustrated in the drawings. As in usual practice, there are various hoods located above the furnace, one of which is indicated in FIG. 1 at 2.

Each self-baking electrode is formed within a vertically disposed, cylindrical, metal casing 3, the lower end of which extends into the furnace and terminates above the furnace charge while the upper end of the casing is open and extends upward through the various hoods such as 2, above the furnace, to an area suitable for workmen to occupy while adding carbon paste to the casing as needed, and while welding on a new casing section if and when the same should ever become necessary.

One purpose of the metal casing 3 is to contain and give proper form and support to the carbon paste 4 after it becomes plastic, as indicated at 4a, and until it has been cured and hardened into a hard carbon electrode, as seen at 4b.

Another purpose of the metal casing 3 is to conduct electrical power from the contact clamps 5 to the electrode 4b. Still another purpose of this metal casing is to conduct heat from the furnace charge 1 and the electrode 4b to the carbon paste 4 and 4a.

The contact clamps 5 consist of a flexible inflatable envelope 6, within a rigid metal ring 7 which may cause the metal clamping members 5 to grip the casing 3 when the flexible envelope 6 is subjected to internal fluid pressure which may be either gas or liquid.

The clamping members 5 are connected to conductor support members 9 as by the depending conductors 10, and the conductor supports 9 are connected by flexible conductors 11 to the main power supply transformer and associated electrical equipment (not shown) that conventionally supply electrical power to the electrodes of an electric arc furnace.

In addition to being supported by the contact clamps 5, the cylindrical metal casing 3 is also supported by a pressure clamp, indicated generally at 12, which includes a flexible, inflatable member 13 within a rigid ring 14, and which may be made to tightly grip the casing 3 when the flexible member 13 is subjected to an internal pressure of fluid in the form of either gas or liquid in any conventional manner.

This type of electrode and casing support is conventional in self-baking electrode furnaces and the construction and operation are well known and understood by those versed in the art. The pressure clamp assembly 12 is attached to a support header 15 by means of hydraulic cylinders 16 and cooperating piston rods 17. As in common practice, when the pressure clamp assembly 12 is moved downward by the hydraulic cylinders 16 while, at the same time the pressure clamp is made to grip the cylindrical casing 3, the casing will be slidably moved downward through the contact clamps 5.

And conversely, when the pressure clamp assembly 12 is released until it no longer grips the casing 3, it may be moved upward relative to the casing, thereby preparing for further downward movement of the casing, if and when necessary.

The support header 15 is attached to a structure including the rods 18, connected at their lower ends to the conductor support members 9, as indicated at 19, and at their upper ends to the hydraulic cylinders 20, as indicated at 21. The piston rods 22 of the cylinders 20 are connected to a suitable support 23 as indicated at 23'. The hydraulic cylinders 20 and piston rods 22 thereof, may be actuated to move the entire electrode column up or down relative to the furnace as desired.

The horizontal support member 24 is carried by the upper portions of the rods 18, and forms a part of the structure suspended from the hydraulic cylinders 20. A nonrotating contact and bearing 25, having a partially spherical center socket 26, is mounted upon the horizontal support member 24.

A companion rotating, semispherical contact and journal 27 is rotatable within the socket 26 of the nonrotating contact and bearing 25. The rotating contact and journal 27 are rigidly attached to the exterior of the upper end portion of a metal tube 28.

The metal tube 28 is suspended from the rotating contact and journal 27 and extends downwardly therefrom concentric to the axis of the cylindrical casing 3, and terminates at a proper distance below the bottom of the contact clamps 5.

A suitable section of the tube 28, preferably the lower end portion thereof as shown in FIG. 1, is threaded on the exterior with a coarse, deep screw thread as indicated at 29. The wall of the tube 28 is formed of a double shell having a space 30 therebetween whereby it may be fluid cooled or heated by any conventional means, either liquid or gas.

The entire tube 28, including the threads 29 thereon, the rotating contact and journal 27, and the nonrotating contact and bearing 25 are all formed of a suitably strong and conductive metal. The bearing surface between the rotating contact and journal 27 and the nonrotating contact and bearing 25 is made in such manner as to carry heavy weight and, at the same time, conduct heavy electrical currents while rotating as well as while stationary.

Suitably sized flexible conductor cables 31 are connected at one end to the nonrotating contact and bearing 25, the other ends thereof being adapted to be connected to various electrical apparatus as hereinafter described.

For the purpose of rotating the tube 28 when desired, a rotational power unit is provided. For the purpose of illustration only this is indicated as a motor 32 carried by the horizontal support member 24, a bevel pinion 33 upon the shaft of the motor and a bevel gear 34 fixed upon the exterior of the tube 38 and meshing with the pinion 33. Any conventional electric circuit may be provided for the motor 32 with conventional switch means therein for closing the circuit to the motor when desired.

The hereinbefore described rotating tube with screw threads thereon, with its rotating contact and journal and its stationary contact and bearing and support structures, together with means for rotating such tube as desired, and also with means for conducting electrical currents to and through said tube comprise a part of this invention which functions usefully with other parts hereinafter described.

One method whereby the benefits of this invention may be attained could be achieved by connecting the conducting systems 29, 28, 27, 25 and 31 to the same main transformer or electrical power source conventionally connected to the flexible conductor 11, thereby causing a portion of the electrical power of the furnace to enter the electrode at its center, at the area of 29, and generating heat in the central portion of the electrode 4b.

Figure 2:
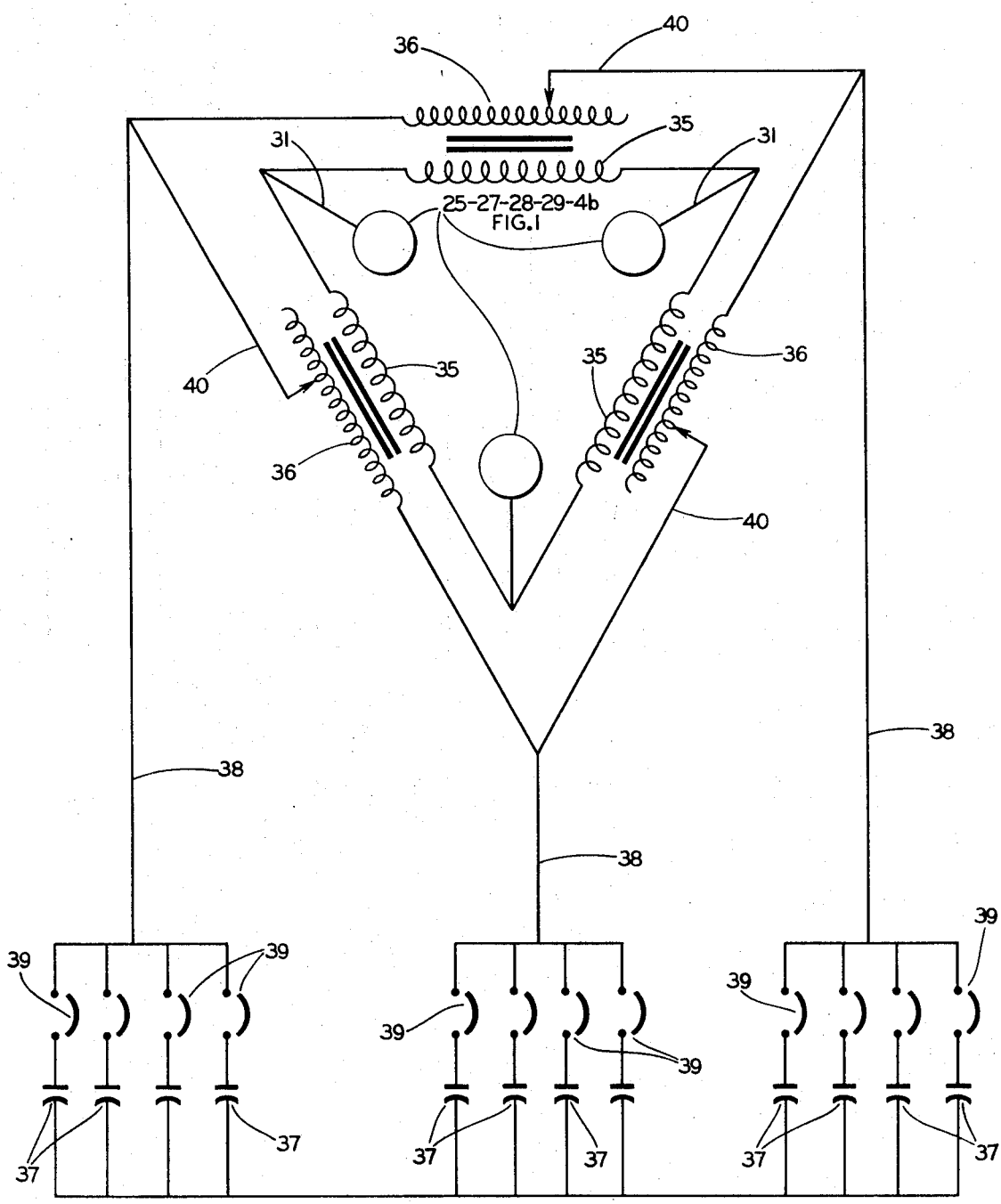
FIG. 2 is a diagrammatic view showing the connection of the three electrodes of an electric furnace to a power factor correctional and control device including a delta-delta arrangement of transformers with means for connecting the same to capacitors.

Another arrangement of the invention is illustrated in FIG. 2, in which is seen a three-phase transformer with its low voltage windings 35 connected to the electrodes 4b by the flexible cables 31, and contacts 25 and 27, and the tube assembly 28 and 29. The high voltage windings 36 of the transformer are connected to capacitors 37 by conductors 38.

Circuit breakers 39 are located in the circuit for connecting the high voltage windings 36 to the capacitors 37, or disconnecting them therefrom, or for changing the amount of capacitance connected to the high voltage windings.

Although the purposes of the invention may be achieved by any one of several possible configurations of the windings of the transformer, a delta-delta arrangement is shown in FIG. 2 for simplicity. Conventional means is diagrammatically indicated at 40 for changing the number of turns of the high-voltage windings 36 whereby the ratio between the low-voltage and high-voltage windings of the transformer may be changed.

The interior of the tube 28 is kept supplied with carbon paste, which may be in the form of chunks as indicated at 41 in FIG. 1. The carbon paste descends in the tube by gravity, or by reason of a gas pressure which may be maintained above it, to completely fill the cavity left as the electrode 4b is forced downward by the screw 29.

OPERATION

In the operation of an electric furnace equipped with the self-baking electrodes embodying the invention, the cylindrical casing 3, supported by the pressure clamps 14 and contact clamps 5, is adjusted to the proper position in the furnace by the hydraulic cylinders 16 and 20. Electric power is furnished to the cylindrical casing 3 through the contact clamps 5, depending conductors 10, conductor supports 9 and flexible cables 11 leading to the main power supply transformer (not shown).

The support tube 28 may be connected through the rotating contact and journal 27, stationary contact and bearing 25 and flexible conductors 31 either with the main power supply transformer or with power factor correctional devices as diagrammatically shown in FIG. 2 and above described.

Carbon paste 4 is continually supplied to the interior of the cylinder 3 through the open upper end thereof and the same is heated by the electric current passed therethrough, becoming plastic and entirely filling the lower portion of the cylinder, as indicated at 4a, and then being baked or cured and becoming a hard carbon electrode, as indicated at 4b.

Whenever the lower portion of the hard carbon electrode 4b is sufficiently burned away, the motor 32 may be operated to rotate the tube 28 in proper direction so that the screw threads 29 thereon will force the electrode further down through the casing 3 into the furnace charge 1.

Workmen are also continually supplying carbon paste to the interior of the tube 28 as indicated at 41, and the same becomes plastic, as indicated at 41a, entirely filling the opening formed in the center of the hard carbon electrode 4b by the screw threaded lower end 29 of the tube 28.

It will thus be seen that neither the metal cylindrical casing 3 nor the metal supporting tube 28 is fed into the furnace charge, only the hard carbon electrode 4b being slidably moved downward out of the lower end of the cylindrical casing 3 by rotation of the threaded lower end 29 of the tube 28.

From the above it will be evident that the essential feature of the invention is the centrally located tubular support 28 terminating at its lower end in the coarse screw 29 embedded in the hardened portion 4b of the electrode, with means 32, 33, 34 for slowly turning the screw 29 so as to force the electrode down as through the casing 3 as needed.

It will also be seen that until and unless the pressure clamp assembly 12 is released, the hard carbon electrode 4b is extruded from the bottom of the casing 3 by proper rotation of the screw 29. It will also be evident that only if the feed screw 29 is rotated with the pressure clamp assembly 12 released, will the casing 3 be carried downward through the contact clamp 5 along with the electrode. This insures that the use of the casing 3 in the furnace charge may be limited to that amount inadvertently burned away at the point where the lower end thereof emerges from the bottom of the contact clamps 5.

It will also be seen that, by reason of the transformer-capacitor combination of FIG. 2 connected to the tubular column 28, very heavy electrical currents may be made to flow in the tubular column 28, the screw 29 and the central portions of the electrode 4b immediately around and below the feed screw. The heating effect of these currents, together with the heat-conducting effect of the screw, is most beneficial to the proper curing of the electrode.

Furthermore, it should be understood that the tubular support column 28 and screw 29 may be fluid cooled or heated by any suitable liquid or gas to any necessary degree. The outer surface of the screw 29 should be kept at temperature consistent with coking of the electrode, while the interior surface of the screw and tubular column should be kept at temperatures consistent with a plastic state of carbon paste.

It will further be obvious that by keeping the interior of the tube 28 supplied with carbon paste which descends by gravity, or by reason of a gas pressure maintained above, it will completely fill the cavity left as the electrode is forced downward by rotation of the screw, thus forming a solid, homogeneous carbon electrode which is inserted into the furnace charge without either an outside metal casing or interior metal reinforcing.

It will also be seen that a desirable feature of the invention is that the electrical currents associated with reactive-kilovolt-ampere component of the power may be kept from flowing through the main power supply transformer and the associated electrical equipment that conventionally supply electric power to the electrode by way of the flexible conductors indicated at 11. Instead, the current associated with the reactive-kilovolt-ampere component of the power may be made to flow to power factor correctional devices independently connected to the electrode as shown in FIG. 2 and heretofore described.

It should be pointed out that although the principle of connecting power factor correctional equipment to the low-voltage structure of an electric furnace functions to assist in curing and hardening a self-baking electrode, it should be understood that this unique method of correcting power factor on an electric furnace is not limited to electric furnaces with self-baking electrodes. Power factor correctional equipment connected as above described and illustrated in FIG. 2 improves the operation of any electric furnace in that it relieves the main supply transformers and associated electrical equipment of a considerable part of the load, namely, that portion of the current associated with reactive power which is offset by action of circuit capacitance, as above described.

It should also be understood that although the arrangement described and illustrated herein shows dielectric or static capacitors as the power factor correctional equipment, this is by way of simplicity of disclosure only and other suitable power factor correctional devices such as rotary condensers or the like are equally useful for this purpose.

The benefits of the present invention may be realized without recourse to electrical apparatus of any description being connected to the centrally located tube 28 or feed screw 29. In such case, the metal mass of the feed screw is so proportioned and its conductive-magnetic properties so arranged that it will be heated by internally circulating currents arising from and induced by electromagnetic induction from electrical currents flowing into the electrode by way of the contact clamps 4. Such induction-heating effect may be clearly enhanced by constructing the feed screw of metal having magnetic properties.

We claim:

1. An electric arc furnace, electrodes in said furnace, means for connecting the electrodes to a main source of electrical power, a transformer having high voltage windings and low voltage windings, means for independently connecting the electrodes to the low voltage windings of said transformer, power factor correctional devices, and means for connecting the high voltage windings of the transformer to the power factor correctional devices.

2. An electric arc furnace as defined in claim 1, in which there are three electrodes, in which the transformer is a three-phase transformer, and in which there are a plurality of power factor correctional devices connected to the high voltage winding of each phase of the transformer.

3. An electric arc furnace as defined in claim 2 in which the power factor correctional devices are capacitors.

4. An electric arc furnace as defined in claim 2, circuit breakers for connecting the capacitors to the high voltage windings and disconnecting them therefrom and for changing the amount of capacitance connected to the high voltage windings.